United States Patent [19]

Jordan et al.

[11] Patent Number: 5,258,121
[45] Date of Patent: Nov. 2, 1993

[54] WASTE TREATMENT WITH NITRATE REMOVAL

[75] Inventors: Edward J. Jordan, Brighton; John L. Irwin, Ann Arbor, both of Mich.

[73] Assignee: Thetford Corporation, Ann Arbor, Mich.

[21] Appl. No.: 2,716

[22] Filed: Jan. 11, 1993

[51] Int. Cl.⁵ .............................................. C02F 3/30
[52] U.S. Cl. ..................................... 210/605; 210/622; 210/195.1; 210/259
[58] Field of Search ............... 210/605, 622, 195.1, 210/259

[56] References Cited

U.S. PATENT DOCUMENTS 4,904,387  2/1990  Jordan ................................. 210/605

*Primary Examiner*—Frank Spear
*Attorney, Agent, or Firm*—Harness, Dickey & Pierce

[57] ABSTRACT

A substantially closed loop waste treatment and water recycling system. The system includes one or more flush-type toilets and urinals which receive flush water from a water return station and deliver waste and flush water to an anoxic reactor. The anoxic reactor contains bacteria which de-nitrifies the mixture. The de-nitrified mixture is transferred into an aerobic digestion chamber where bacteria oxidizes various components of the mixture to obtain a liquid product having a high concentration of nitrates and a low concentration of soluble carbonaceous compounds. This liquid product is filtered, treated with activated carbon, disinfected, and subsequently returned to the water return station as colorless and odorless flush water. Recycled flush water in excess of flush water requirements is further treated in a secondary nitrate removal station and discharged from the system.

20 Claims, 2 Drawing Sheets

WASTE TREATMENT WITH NITRATE REMOVAL

BACKGROUND AND SUMMARY OF THE INVENTION

The present invention relates generally to improvements in waste treatment. More particularly, this invention relates to substantially closed looped waste treatment and water recycling toilet systems.

Waste treatment and water recycling toilet systems to which the present invention relates are generally shown in U.S. Pat. No. 3,950,249 issued Apr. 13, 1976 and U.S. Pat. No. 4,210,528, issued Jul. 1, 1980. U.S. Pat. No. 4,904,387, issued Feb. 27, 1990, which is hereby incorporated by reference, discloses a closed loop waste treatment and water recycling toilet system. The above patents are all commonly assigned to the assignee of the present application.

Municipal-type sewage treatment systems have lowered the organic compound and nitrogen concentration in the treated sewage by biologically treating the sewage under anoxic conditions followed by subsequent biological treatment under aerobic conditions. This sequence is advantageous because the bacteria in the anoxic reactor utilize organics found in the sewage to accomplish the breakdown of nitrates. Thus, a limited amount or no supplemental organic source needs to be added into the system. Such a flow through system, however, does requires the removal of sludge, creating the problem of sludge transport and disposal. Additionally, some of the nitrates produced during the treatment process flow out of the system and are not fully removed by the system.

Closed loop systems which recycle effluent for toilet-flush use have been advantageous in waste treatment since little or no external water supply is needed, thereby minimizing the unnecessary use of potable flush water. Difficulties have arisen, however, in the biological treatment processes of these systems. As a result of these deficiencies, inadequate treatment of waste often results in the production of obnoxious odors and colors in the flush water along with a rapid accumulation of biological solids in the system.

The closed loop system disclosed in U.S. Pat. No. 4,210,528 provides a system having effective management of nitrogen so that the system can be made of a reasonable size while avoiding undesirable odors, color and the buildup of solids. U.S. Pat. No. 4,904,387 discloses a system in which the management of the nitrates and nitrogen in the system is improved to increase treatment efficiency.

In closed loop systems where the majority of the processed waste water will be recycled and subsequently returned back to the system and where the remaining portion will be discharged, generally to ground water either through subsurface leaching or surface irrigation, it is desirable to remove nitrates from the discharged water. Discharge regulations sometimes require a nitrate-nitrogen concentration level of less than ten milligrams per liter (10 mg/l).

It is therefore an object of the present invention to provide for the enhanced treatment of discharge water in a waste water treatment and recycling system. The treatment decreases nitrate concentrations in the discharge water to levels below drinking water standards.

Another object of the present invention is to provide a nitrate removal system in which a nitrate removal medium used in the secondary removal step can be regenerated within the system without harm to the system or without detriment to the system's efficiency.

In accomplishing the above objects, the present invention provides for nitrate-nitrogen removal from water which is to be discharged from a substantially closed loop water recycling toilet system. The water recycling toilet system of the present invention includes a waste delivery system, a trap, a sump chamber, an anoxic chamber or reactor, an aerobic digestion chamber, a filter, absorption and disinfection systems, along with a water return and nitrate removal stations.

The delivery system, as illustrated, includes a single flush-type toilet. It should be understood, however, that it could include a plurality of toilets or a number of toilets and a number of urinals. As used herein, the term "toilet" is inclusive of all of the above. In addition to delivering toilet waste, the delivery system receives all the waste water from the facility in which it is installed, including waste water from sinks, lavatories, dishwashers, showers and the like. The delivery system includes a means for drawing flush water to the toilet from the water return system and means for delivering the waste and flush water to the trap and the sump.

From the sump, the mixture of waste and flush water is transferred into the anoxic reactor which contains a bacteria laden sludge. The anoxic reactor also contains an agitator means which periodically mixes the contents of the reactor to enhance de-nitrification of oxidized nitrogen compounds, such as nitrates, in the mixture.

While the process of biological de-nitrification is complex and not yet fully understood, it is generally accepted that facultative bacteria, which exists in the sludge, satisfies its metabolic requirements preferentially through the dissolved oxygen found in the waste liquid. However, if the supply of dissolved oxygen is sufficiently low, anoxic conditions will exist and, under these conditions, the bacteria will reduce oxygen containing compounds, such as nitrates or other oxidized nitrogen compounds. The anoxic reactor in this invention is maintained under these conditions.

Since the bacteria in the anoxic reactor utilizes toilet waste as the source of organics needed to effect the breakdown of nitrates and other oxidized nitrogen compounds, the amount of organic waste in the reactor is substantially lowered and bicarbonates are produced. The nitrogen gas which is also produced in the reactor is vented from the system.

Liquid from the anoxic reactor has a high concentration of bicarbonates and ammonium compounds and a low concentration of nitrates. It can therefore be seen that the anoxic reactor is not located in the system to accomplish the breakdown of nitrogenous compounds, such as ammonia, but rather to remove nitrates from the flush water and a substantial quantity of organic material from the toilet waste. The bicarbonates produced in the anoxic reactor are themselves necessary for the complete oxidation of ammonium compounds in subsequent processes of the toilet waste treatment system.

Liquid from the anoxic reactor is transferred to the aerobic digestion chamber. The aerobic digestion chamber contains biologically active solids and an aeration means which is operated to provide a sufficient amount of oxygen to effect both the oxidation of the organic compounds and the nitrification of nitrogenous compounds. Although biological nitrification is also not yet fully understood, it has been found that under sufficient oxygen conditions, the nitrifying bacteria in the biologically active solids are able to oxidize the ammonium compounds and convert the compounds into nitrates. The aerobic digestion chamber is maintained under these conditions so that the bacteria will utilize the bicarbonates found in the mixed liquid as the necessary carbon source for accomplishing the desired nitrification. The fluid from the aerobic digestion chamber is therefore low in ammonium and carbonatious compounds, but is high in nitrates.

As used herein, the expression "biologically active solids" includes bacteria in both a suspended growth form and an attached growth form. In a suspended growth reactor, the bacteria is in suspension in the material commonly called "activated sludge" while, in an attached growth reactor, the bacteria is attached to solid bodies within the reactor. While the invention is particularly described with respect to the use of activated sludge in the aerobic digestion chamber, it should be understood that it is within the purview of this invention to use bacteria in the attached form.

Liquid is removed from the aerobic digestion chamber and passed, under pressure, to filters which remove suspended solids, colloidal matter, and large amounts of bacteria from the liquid. The suspended solids, colloidal matter and bacteria are then transferred back to the aerobic digestion chamber.

From the filter, filtrate is transferred to an absorption station which includes a bed of activated carbon. The internal pore structure and the affinity of the activated carbon for organic matter removes undesirable colors and odors from the filtrate. The filtered liquid is then disinfected and transferred to a water storage tank from which, on demand, it is delivered to the toilet as flush water completing the system's cycle.

Processed water in excess of the flush water requirements is treated in a nitrate removal system before being discharged. Since more water is being processed then is needed for flush water requirements, the supplemental, de-nitrified water is discharged from the system.

Due to the arrangement of present invention, nitrates produced in the aerobic digestion chamber are present throughout the filtering, absorption, disinfecting, water return and delivery systems. The presence of nitrates in the liquid passing through the filtering and absorption systems prevents the reduction of sulfates which may also be present in the liquid. The reduction of sulfates would otherwise cause the production of hydrogen sulfide which has a readily recognizable obnoxious odor. Nitrates are still present in the flush water as it is delivered with toilet waste into the anoxic chamber. This induces greater biological destruction of organic waste and increased production of bicarbonates for use in the aerobic digestion chamber. The management of nitrates in the present system therefore prevents production of hydrogen sulfide or other obnoxious odors, provides for efficient biological treatment of toilet water and a corresponding reduction in the size requirements for the aerobic digestion chamber.

The present invention also provides for indefinite retention of sludge solids. This ensures sufficient microorganism age to accomplish the desired results in the biological treatment process. In the system of this invention, the amount of biologically active solids in the aerobic chamber and the amount of organic material supplied from the anoxic reactor are balanced so that minimum sludge accumulation and maximum nitrification rates are achieved in the aerobic chamber. The elimination of excess sludge production, and the corresponding need for its disposal, reduces the potential pollution of external and subterrainean water supplies. Also, the recycling and reuse of water prevents the further unnecessary usage and pollution of water supplies.

Additional benefits and advantages of the present invention will become apparent to those skilled in the art to which this invention relates from the subsequent description of the preferred embodiments and the appended claims, taken in conjunction with accompanying drawings.

DETAILED DESCRIPTION OF THE PREFERRED EMBODIMENT

Figure 1:
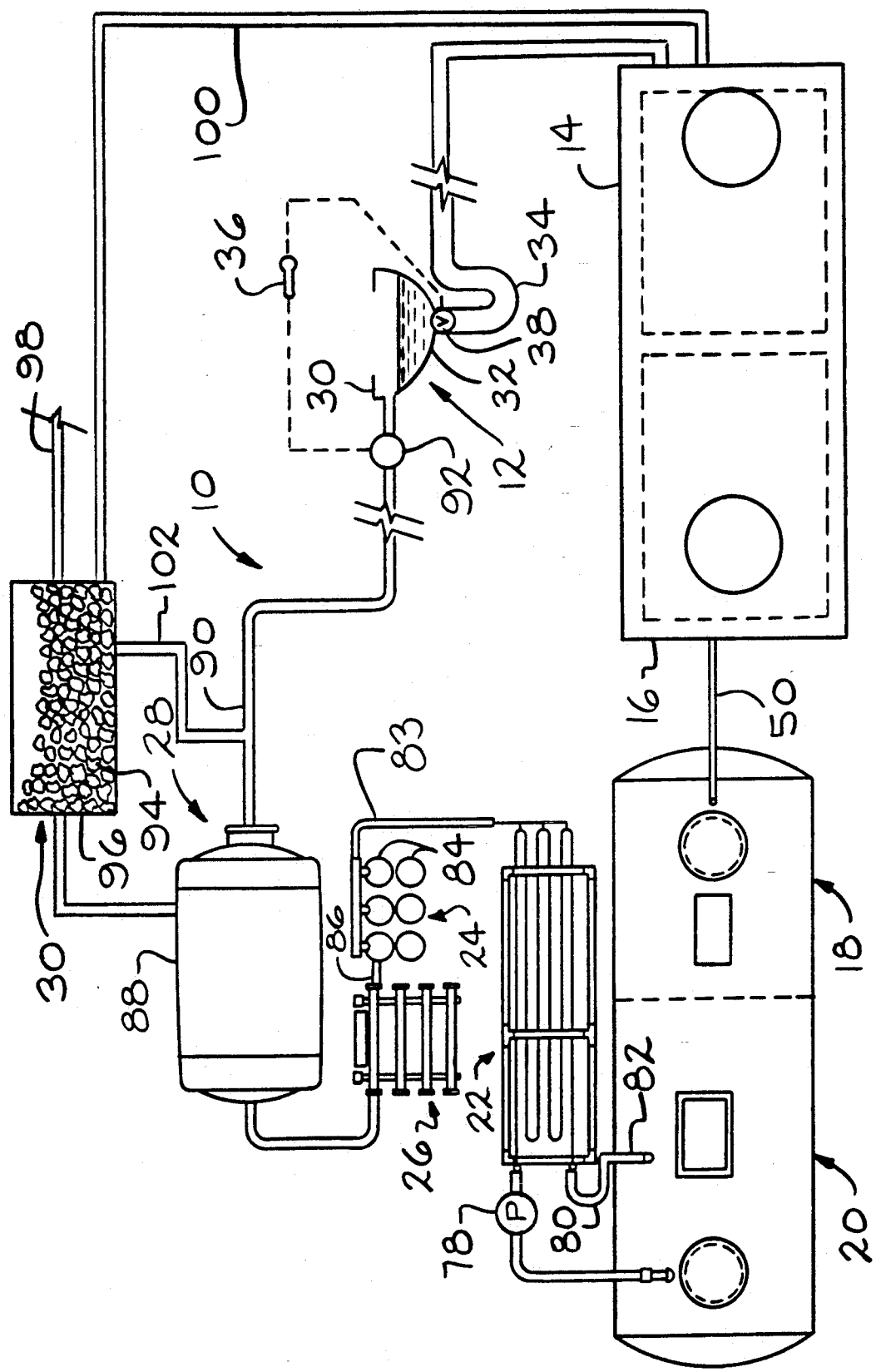
FIG. 1 is a diagrammatic view, partially in plan, of a waste treatment and water recycling toilet system of the present invention.

The waste treatment and a water recycling toilet system of this invention, indicated generally at 10 in FIG. 1, comprises a waste delivery system 12, a trap 14, a sump chamber 16, an anoxic reactor 18, an aerobic digestion station 20, a filter system 22, an absorption system 24, a disinfecting system 26, a water return system 28, and a secondary nitrate removal system 30.

The delivery system 12 includes a toilet 31 having a waste deposit bowl 32 and an outlet passage 34. The system 12 also includes a demand actuator 36 which is operatively associated with a toilet valve 38 located in the passage 34. In response to manual operation of the actuator 36, the valve 38 is opened allowing the waste contained in the bowl 32 to flow through the passage 34 and into the trap 14. Other waste water, such as that from sinks, lavatories, dishwashers, etc., will be combined with and also flow into the trap 14.

The trap 14 is similar in design to a septic tank and provides primary treatment through settling and scum removal. Floated and settled solids will be removed from the trap 14 at a minimum of once per year through a ground level manway 40. Removal is accomplished using conventional septic tank pump trucks.

From the trap 14, the waste mixture flows by gravity into a sump chamber 16. Based on design flows, the sump chamber 16 is designed with a minimum of two days retention.

Figure 2:
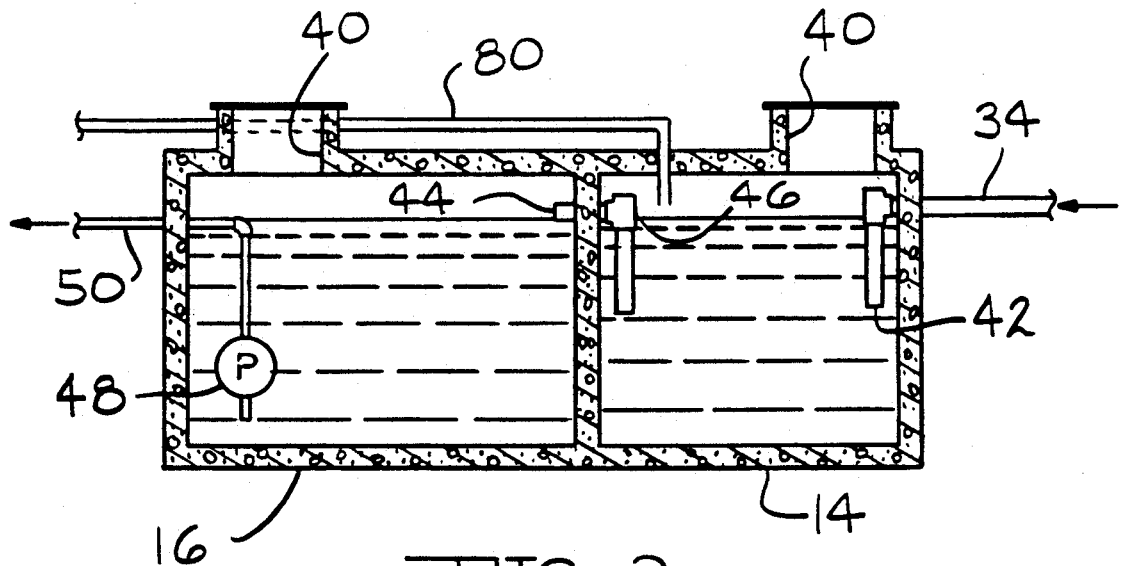
FIG. 2 is a sectional view taken substantially along line 2—2 in FIG. 1 of a portion of the system.

FIG. 2 illustrates the details of the trap 14 and sump chamber 16. As shown, both the trap 14 and the sump 16 are underground concrete storage tanks each having a manway opening 40 to access the interior of the tanks. Outlet passage 34 delivers waste from the toilet 31 to the trap 14. The discharge end 42 of the passage 34 is located below the fill line of the trap 14. The trap 14 allows non-organic particles such as sand and dirt to settle to the bottom of the trap for later removal and disposal. Trap 14 can also include a mechanism to breakup the solid particles in the toilet waste. Once the level of waste in the trap reaches an opening 44 to the sump chamber 16, the waste flows through a conduit 46 into the sump chamber 16.

The sump chamber 16 contains a discharge pump 48 which pumps the waste mixture through a conduit 50 into the anoxic reactor 18. The sump 16 is used to regulate or equalize the flow of waste into the anoxic reactor 18 and provides an even flow into the anoxic reactor 18 regardless of the usage of the toilet 31 or the other waste water flows. Waste water is pumped from the sump 16 into the anoxic reactor 18 by a rail mounted grinder pump 48. The pump schedule is controlled by a system micro-processor (not shown) and has its operation also limited by a low level float (not shown).

Figure 3:
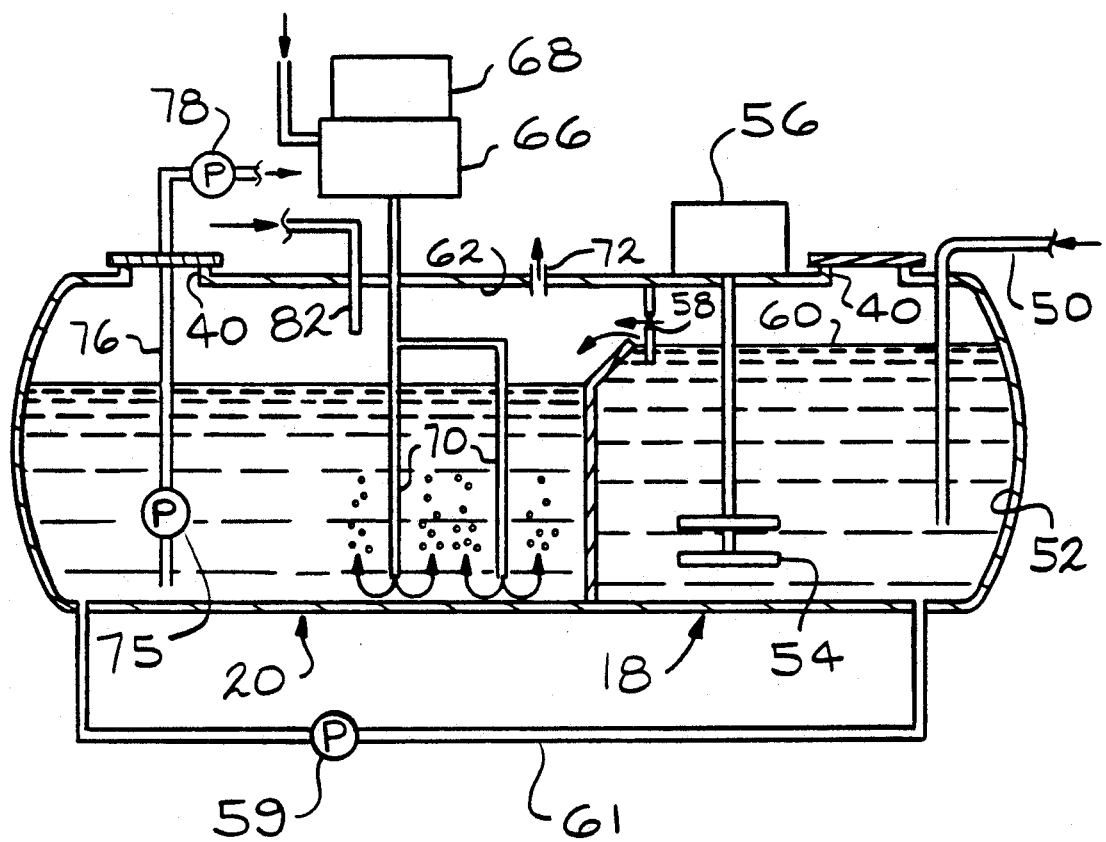
FIG. 3 is a sectional view taken substantially along line 3—3 in FIG. 1 of a portion of the system.

Referring now to FIG. 3, the biological systems will now be described. Waste water from the sump 16 is pumped into the anoxic reactor 18 where de-nitrification occurs. The anoxic reactor 18 includes sludge containing bacteria which provides for partial biological treatment of the influent toilet waste, along with de-nitrification of nitrates contained in the influent. The reactor 18 has a treatment chamber 52 and includes a manway 40 that provides access into the chamber 52.

An agitator 54 is driven by an air pump 56 that operates intermittently to provide for the intimate physical contact of toilet waste, flush water and bacteria in the anoxic sludge. Bacteria in the reactor 18 utilizes toilet waste as the source of organics which are necessary to effect the breakdown of nitrates into nitrogen gas and bicarbonates. During this process, the bacteria substantially lowers the actual amount of organic waste found in the reactor 18. When the air pump is off, the solid matter within the chamber 52 will settle to the bottom of the chamber 52.

The chamber 52 is maintained at low oxygen conditions (not in excess of 0.5 milligrams per liter, and ideally at 0.0 milligrams per liter, dissolved oxygen) in which the primary compound being reduced by the bacteria is nitrate. Such conditions are known as anoxic conditions. The compounds produced in the treatment chamber 52 under these conditions includes nitrogen gas and bicarbonates.

Gases are released from a chamber 52 through a conventional one-way vent valve 58. The valve 58 prevents the entry of oxygen into the chamber 52 and thereby maintains the low concentration of dissolved oxygen in the partially treated mixture 60. The introduction of additional influent into the chamber 52 causes partially treated liquid 60 to washover into the aerobic digestion station 20 thereby controlling the fluid level in the anoxic chamber 52. A reversible pump 59 is also operable to move liquid 60 from the chamber 55 through the conduit 61 to the station 20 and vice versa. If desired, the trap 14 and sump 16 can also be maintained in anoxic conditions to begin the biological treatment of the influent toilet waste and the de-nitrification of nitrates contained in the influent. The anoxic chamber 18 has approximately a one day retention time.

The aerobic digestion station 20 is located in the system 10 downstream of the anoxic reactor 18 and provides for further biological treatment of the fluid coming from the anoxic reactor 18. In the aerobic digestion station 20, the influent undergoes carbonatious oxidation and the nitrification of ammonium compounds to produce nitrates.

The aerobic station 20 comprises a treatment chamber 62, containing biologically active solids in the suspended growth mode, and an aeration means 64, which including a pump 66 driven by a motor 68. The aeration means 64 operates to deliver air, through conduits connected to fine bubble diffusers 70, into the de-nitrified effluent and the chamber 62. The aeration means 64 also agitates the influent material in the chamber 62 and provides for thorough mixing of the de-nitrified liquid and the activated sludge. The aeration means 64 further provides a source of oxygen for the bacteria in the activated sludge thus enabling the de-nitrification process to be accomplished. The bacteria utilizes bicarbonates in the liquid as the carbon source necessary to effect the oxidation of nitrogenous compounds, such as ammonia, in producing nitrates.

While only one aerobic digestion chamber 20 is shown in the drawing, another embodiment of the present invention includes a series of three aerobic chambers 62 that maximizes nitrogen removal. The last aerobic chamber 20 in the series is connected by an internal recirculation loop to the anoxic reactor 18. The internal loop is used to pump influent, rich in nitrates, into the anoxic reactor 18 for de-nitrification. The flow of this internal loop is controlled utilizing a percentage timer and the ratio of internal recycle flow to influent flow is approximately eleven to one. In this manner, additional nitrate rich influent will be received in the anoxic reactor 18 during periods of low toilet 31 use.

Automatic PH control is also provided in the first aerobic chamber 20. Generally, the aerobic system 20 will require alkalinity. This can be provided by the automatic injection of liquid sodium hydroxide.

In the process, organic matter in the waste flow is additionally digested in the chamber 62. The dissolved oxygen concentration in the aerobic digestion chamber 62 should be maintained at least above two milligrams per liter and should ideally be above four milligrams per liter to obtain maximum nitrification. To achieve this oxygen concentration, it is preferable that the diffuser 70 admit air into the chamber in the form of small bubbles, as suggested above, at a rate of at least thirty-thousand feet per pound of biochemical oxygen demand (BOD) being loaded on the aerobic chamber 20. Where mixing is accomplished by means other than the aeration means 64, lower aeration rates might be used to achieve the desired dissolved oxygen concentration.

Treated liquid in the chamber 62 is pumped into a conduit 76 by a grinder pump 75. The grinder pump 75 macerates any solids in the liquid. A second pump 78 increases the pressure and pumps the liquid into the filtering system 22. The filtering system 22 separates solids, sludge, organic matter, and bacteria from biologically treated liquid via a tubular filter membrane and passes the clarified effluent onto the absorption system 24. The filter membrane preferably has a sub-micro pore size to provide ultrafiltration and substantially complete filtration of bacteria and colloidal particles of a size greater than 0.5 microns from the liquid. The filtrate should ideally not contain BOD in excess of five milligrams per liter. This assures that there will be no significant de-nitrification of the filtrate prior to its entrance to the anoxic chamber as the flush water.

The flow rate of the influent to the filtering system 22 is purposely made greater than the filtering capacity of the filter membrane. As a result, some of the influent does not pass through the filters but instead washes over the surface of the filters, cleaning these surfaces, and returns through conduits 80 and 82 to the aerobic chamber 62.

Filtered liquid or water passes through a conduit 83 into a bed of activated carbon 84 in the absorption system 24. The internal pore structure of the activated carbon 84 and the affinity of the activated carbon for organic matter provides for the removal of undesirable color and odor from the filtered water.

The colorless, odorless water is then transferred from the absorption system 24 through a conduit 86 to a disinfection system 26 which is of a conventional structure. As such, the system 26 may utilize ultraviolet light to disinfect the water.

From the disinfection system 26, the disinfected nitrate-containing water is transferred to the water return system 28. The water return system 28 includes a storage tank 88 and a conduit 90 communicating with the toilet bowl 32. A valve pump unit 92, operatively associated with the demand actuator 36, is located in the conduit 90. In response to activation of the actuator 36, the pump unit is operated and the recycled water is pumped through the conduit 90 and delivered to the toilet bowl 32 for use as flush water.

Since the present system 10 receives waste water from all the water fixtures within the installation facility, not just from toilets, the system 10 receives more water than required for use as toilet flush water. As a result, excess treated water can be and is discharged from the system 10. For this reason, the system 10 is not a true closed loop system.

Prior to its discharge, the recycled water in excess of the flush water requirements contains nitrates. This water is therefore transferred from the flush water storage tank 88 to the secondary nitrate removal system 30.

In the nitrate removal system 30, which operates in a manner similar to a water softener, nitrates are removed from the excess water via a selective ion exchange. Nitrate-nitrogen removal is achieved by passing the excess water over a nitrate selective strong base anion resin 94 which is held in a tank 96 of the removal system 30. The ion exchange could alternatively be accomplished using standard strong base anion resins. However, these standard resins have a preferential selectivity for sulfate ions which are often present within the waste water in high concentrations. Where high concentrations of sulfates are present, standard resins are not efficient in removing nitrate ions and will result in nitrate rich water being discharged from the system 10 through the discharge conduit 98. Where low nitrate discharge levels are required, nitrate selective resins are therefore a better choice, especially in waste water applications.

Nitrate selective resins 94 are produced by various manufacturers. They are functionalized forms of cross linked organic polymers which can be regenerated with a salt brine backwash. One such nitrate selective resin is manufactured by Sybron Chemicals, Inc. of Birmingham, N.J. and is marketed under the tradename Ionac SR-6. The regenerating brine is introduced into the tank 96 through the discharge conduit 98 or through a separate inlet provided on the tank 96. The regenerating brine is backwashed over the resin 94 for a period of time sufficient to regenerate the resin and becomes laden with nitrates. This nitrate laden regenerate backwash is then transferred through a return conduit 100 into the trap 14 where the nitrates can be used in the treatment of the waste. Because the flow of regenerate backwash is small, the effect of the salt on the normal operation of the biological treatment system is not significant. Alternatively, the regenerate brine can be introduced into the flush water of the system through conduit 102 or discharged from the system 10.

While the above description constitutes the preferred embodiments of the present invention, it will be appreciated that the invention is susceptible to modification, variation and change without departing from the proper scope and fair meaning of the accompanying claims.

What is claimed is:

1. A substantially closed loop multi-stage method for treating toilet waste and recycling treated liquid therefrom, said method comprising the steps of:
   a. receiving said waste at a first stage;
   b. flushing said waste from said first stage with flush water from a water storage tank to form a mixture of said waste and flush water;
   c. transferring said mixture to a second stage containing biologically active materials;
   d. maintaining said second stage under anoxic conditions to cause de-nitrification of said mixture;
   e. transferring said mixture from said second stage to a third stage containing biologically active materials;
   f. maintaining said third stage under aerobic conditions sufficient to cause nitrification of nitrogenous compounds in said mixture thereby producing a nitrate-containing liquid;
   g. transferring said nitrate-containing liquid from said third stage to a filtering stage;
   h. filtering said nitrate-containing liquid at said filtering stage to separate nitrate-containing water from solids contained therein;
   i. transferring said nitrate-containing water from said filtering stage to said water storage tank where it will serve as said flush water in said first stage;
   j. transferring an amount of said nitrate-containing water in excess of flush water requirements to a fourth stage;
   k. removing nitrates in said fourth stage from said amount of nitrate-containing water in excess of said flush water requirements to thereby produce low nitrate concentration water; and
   l. discharging said low nitrate concentration water out of said substantially closed loop.

2. The method of claim 1 wherein said nitrate removal step in said fourth stage includes subjecting said nitrate containing water to a nitrate removing medium which is an ion exchange medium.

3. The method of claim 1 wherein said nitrate removal step in said fourth stage includes subjecting said nitrate containing water to a nitrate removing medium which is a nitrate selective strong base anion resin.

4. The method of claim 1 further comprising the step of regenerating said nitrate removing medium with a backwash and producing a regenerate brine.

5. The method of claim 4 further comprising the step of discharging said regenerate brine into said substantially closed loop.

6. The method of claim 5 wherein said regenerate brine is discharged into said first stage.

7. The method of claim 1 further comprising the step of transferring said mixture from said first stage to a trap in which solid particles are separated from said mixture.

8. The method of claim 7 further comprising the step of transferring said mixture from said trap into a flow equalization sump chamber.

9. The method of claim 1 further comprising the step of regulating the flow of said mixture during transferring of said mixture into said second stage.

10. The method of claim 1 further comprising the step of agitating said mixture in said second stage to enhance de-nitrification.

11. The method of claim 1 further comprising the step of passing air through said mixture during said third stage to enhance nitrification.

12. A substantially closed loop waste treatment and water recycling toilet system comprising:

a. a toilet station including a waste receiving toilet and means for admitting flush water to said toilet to flush said waste from said toilet and form a mixture of said waste and said flush water;

b. a pre-treatment station coupled to receive said mixture from said toilet station, said pre-treatment station including a trap for removing particles from said mixture and a sump for regulating the flow of said mixture out of said pre-treatment station;

c. a biological treatment station coupled to receive said mixture from said pre-treatment station, said biological treatment station including an anoxic chamber and a aerobic chamber, said anoxic chamber being maintained under anoxic conditions and containing biologically active sludge, said anoxic chamber also including means for mixing said sludge with said mixture to facilitate de-nitrification of said mixture, said aerobic chamber having biologically active solids contained therein and being coupled to receive said mixture from said anoxic chamber, aeration means for supplying air to said mixture in said aerobic chamber and for agitating said mixture to induce nitrification of nitrogenous compounds and to generate nitrates in said mixture;

d. a filtering station coupled to receive said mixture from said aerobic chamber and including a filter for separating nitrate-containing water from solids in said mixture;

e. a purification station coupled to receive said nitrogen-containing water from said filtering station, said purification station including an absorbent material which removes odor and color from said nitrate-containing water when circulated therethrough;

f. a flush water storage station coupled to receive said nitrate-containing water from said purification station for use of said nitrate-containing water as said flush water in said toilet station;

g. a nitrate removal station coupled to receive an amount of said flush water in excess of flush water requirements of said toilet station, said nitrate removal station including a de-nitrification chamber having a nitrate removing medium therein, said medium removing nitrates from said amount in excess of flush water requirements when in contact therewith to produce discharge water having a low nitrate concentration; and h. means for discharging said discharge water from said de-nitrification chamber and out of said substantially closed loop system.

13. The system according to claim 12 wherein said medium is an ion exchange medium.

14. The system according to claim 12 wherein said medium is a nitrate selective strong base anion.

15. The system according to claim 12 wherein said medium is regenerable.

16. The system according to claim 15 wherein said ion exchange medium is regenerable with a salt brine thereby producing a regenerate brine.

17. The system according to claim 16 wherein said nitrate removal station is coupled to transfer said regenerate brine into said substantially closed loop.

18. The system according to claim 17 wherein said regenerate brine is transferred into said trap.

19. The system according to claim 17 wherein said regenerate brine is transferred into said toilet station.

20. The system according to claim 12 wherein said low nitrate concentration water has a nitrate concentration level of less than 10 mg/l.

* * * * *